June 16, 1925.

S. S. FALKINBURG

REBOUND CHECK

Filed Aug. 25, 1924

1,542,046

Witnesses:
W. F. Kilroy
Harry R. Levlitz

Inventor:
Samuel S. Falkinburg
By Edward Fay Wilson, Atty.

Patented June 16, 1925.

1,542,046

UNITED STATES PATENT OFFICE.

SAMUEL S. FALKINBURG, OF CHICAGO, ILLINOIS.

REBOUND CHECK.

Application filed August 25, 1924. Serial No. 734,046.

*To all whom it may concern:*

Be it known that I, SAMUEL S. FALKINBURG, a citizen of the United States, and resident of Chicago, in the county of Cook and State of Illinois, have invented certain new and useful Improvements in a Rebound Check, of which the following is a specification.

My invention relates to improvements in rebound checks for use on automobiles to prevent the automobile body rising too far after it has been depressed.

The object of my invention is to provide a rebound check of simple character; which can be readily secured in place without the necessity of doing any machine work upon the automobile; and which, when once secured in place will not tend to be loosened by the strains produced by driving over rough roads. A further object is to provide means whereby the length of the device can be accurately and quickly adjusted.

My invention will be more readily understood by reference to the accompanying drawing forming part of this specification and in which:—

Figure 1:
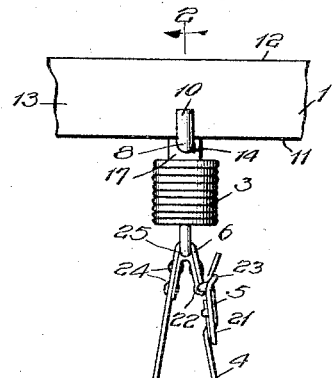
Figure 1, is a fragmentary vertical section of an automobile showing a side view of a rebound check with which it is equipped and which rebound check embodies my invention in a preferred form.
Figure 2:
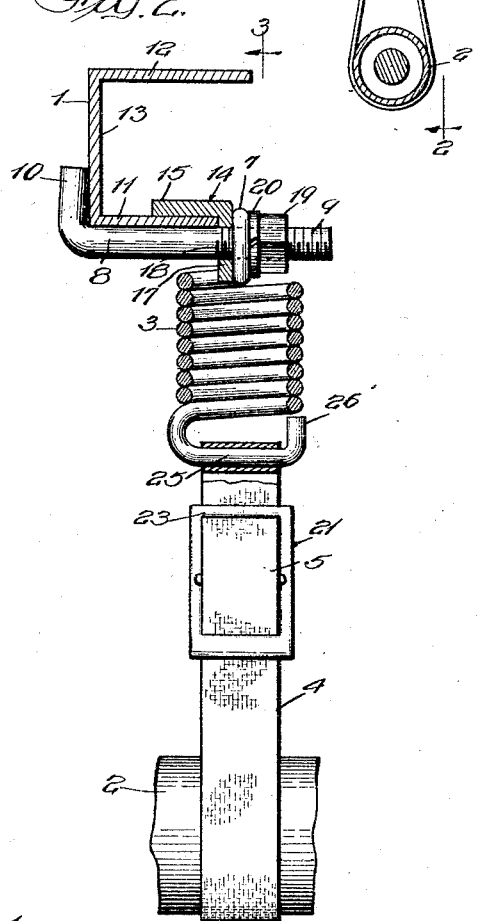
Figure 2, is an enlarged fragmentary vertical sectional view on the line 2—2 of Fig. 1.
Figure 3:
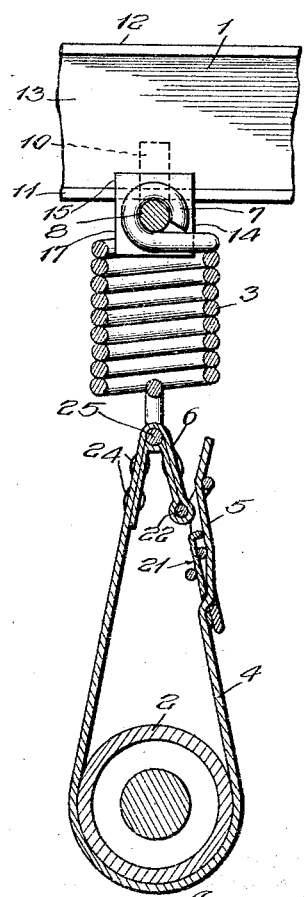
Figure 3, is a fragmentary vertical sectional view on the line 3—3 of Figure 2.

In said drawings 1 illustrates a channel side member of the automobile chassis frame and 2 illustrates the axle housing which as usual extends transversely of the frame and is spring connected to the frame in any usual manner. The regular springs are not shown.

The rebound check provides a connection between the frame and the axle housing which can yield to some extent to permit the two members to separate somewhat but which prevents their separation to such an extent as to endanger the main load carrying springs.

As shown, my improved rebound check consists of an extension spring 3 secured at its upper end to the chassis frame, and connected at its lower end to a strap connector 4 which is adapted to pass down around the axle housing 2 and having its free end 5 connected to the opposite end 6 so as to form a loop in which the axle housing lies.

The spring 3 is close wound and normally the coils thereof lie in close contact as shown. It is capable of being extended by a pull on the strap 4.

For securing the spring to the chassis member 1, I form the upper end of the spring into an eye 7, and I provide a bolt 8 formed of a rod provided with a threaded end 9 and bent at the other end to form a head 10 so that the bolt is what is known as a hook bolt.

The member 1 is usually in channel form having its two flanges 11 and 12 horizontally and its web 13 vertically arranged. The hook bolt 8 is arranged with its head against the web 13 and the body of bolt close to the under side of the lower flange 11. To hold up the free end of the bolt I provide an angle clamp member 14 having an arm 15 adapted to contact with the upper side of the lower flange 11 and a second arm 17 provided with a hole 18 for receiving the free end of the bolt 8. I arrange the spring eye 7 just outside of the arm 17 of the angle clamp member 14 and I secure the whole tightly upon the channel member 1 by a nut 19 screwed into the threaded end of the bolt. Between the nut 19 and the eye 7 I preferably place a split washer 20 of usual form to prevent the nut 19 jarring loose.

The strains to which the spring 3 and eye 7 are subjected are downward and I place the eye outside of the angle member whereby the downward strain is taken directly by the angle member and lower flange 11 of the channel 1.

This construction also has another advantage in that the strain on the eye being away from the channel and the angle member support arranged between the eye and the channel member the angle member acts as a fulcrum and the strains consequently tend to force and hold the hooked end of the bolt upward against the channel member, in other words tend to retain the bolt in operating position. It will be observed that the threaded end of the bolt is made extra long so that the device can be applied to channel members of different sizes and then the extra length if any can be cut off.

The strap 4 is preferably made of a single piece of suitable flexible strap material. I secure a buckle 21 to the end 6 of the strap by passing the end 6 around a bar 22 of the buckle and the end of the strap is secured to the body of the strap by rivet like fasteners 23 close to the bar 22. The end of the strap then secured a second time to the body by rivet like fasteners 24 forming a space for receiving the end 25 of the spring 3. This end of the spring is bent transversely of the spring where it connects with the strap and the extreme end 26 of the spring is bent up at a right angle to prevent the strap slipping off.

The buckle is of the pinch plate kind as differentiated from the tongue variety and consequently I am enabled to adjust the length of the strap loop accurately to fit the conditions and I do not have to weaken the strap by making holes in it.

As many modifications of my invention will readily suggest themselves to one skilled in the art, I do not limit or confine my invention to the specific details of construction herein shown and described.

I claim:

1. A rebound check comprising a strap adapted to pass beneath an axle, an extensible spring connected at its lower end to the upper part of the strap, the upper end of the spring formed into an eye, a hooked bolt passing through the eye, an angle member having a hole in one flange for receiving said bolt, the other flange of the angle member adapted to engage over a frame part above the axle, the angle member arranged between the spring eye and the hooked end of the bolt and means for drawing and holding the hooked end of the bolt and the angle member clamped against and upon a frame member as and for the purpose specified.

2. In a rebound check of the kind described, an extensible spring, one end of the spring formed into an eye, adapted to stand vertically, a bolt passing through said eye, an angle member having a hole in one flange for receiving the bolt, the other flange adapted to extend parallel with the body of the bolt and toward the head of the bolt, the angle member arranged between the spring eye and the head of the bolt.

3. In a rebound check of the kind described, an extension spring, the upper end of the spring formed into a central eye adapted to stand vertically, a bolt having a hooked head passing through the eye, an angle member having a hole in one flange for receiving the bolt, the other flange of the angle member projecting toward the head of the bolt and substantially parallel with the bolt, the spring eye arranged on the bolt, outside of the angle member and a nut on the bolt adapted to clamp the spring eye against the angle member, the angle member to and upon one edge of a supporting member, and the hooked head of the bolt against the opposite edge of the supporting member.

4. In a rebound check of the kind described means for securing the device upon a supporting member having a horizontally extending flange, comprising a bolt having a hooked head adapted to engage one edge of the supporting member and to extend beneath same, an angle member having a hole in one flange to receive the bolt, the other flange of the angle member adapted to extend over the supporting member, a check spring provided on its upper end with an eye to receive the bolt and arranged on the bolt against the outer side of the angle member and a nut on the bolt for clamping the eye against the angle member and the angle member and hooked end of the bolt against the two edges of the supporting member.

5. The combination with a frame member having a vertical web and a horizontal flange at its lower edge, a clamp for securing a pull spring dependent below said flange, comprising an angle member arranged with one leg in contact with the upper surface of said horizontal flange and the other leg against the free edge of said flange, a threaded bolt adapted to extend across beneath the flange and provided at one end with a head for contact with said web, the said dependent leg provided with an opening to receive the bolt and in position to hold the bolt close against the underside of said flange, a spring provided with an eye to receive the bolt, the eye arranged on the bolt and against the outer surface of said dependent leg and a nut on the bolt for tightly clamping the several parts together.

Signed at Chicago, Illinois, this 22nd day of August, 1924.

SAMUEL S. FALKINBURG.